(12) United States Patent
Itoh et al.

(10) Patent No.: US 6,966,197 B2
(45) Date of Patent: Nov. 22, 2005

(54) AIR CONDITIONER WITH DEHUMIDIFYING AND HEATING OPERATION

(75) Inventors: Satoshi Itoh, Kariya (JP); Motohiro Yamaguchi, Hoi-gun (JP)

(73) Assignee: Denso Corporation, Kariya (JP)

( * ) Notice: Subject to any disclaimer, the term of this patent is extended or adjusted under 35 U.S.C. 154(b) by 143 days.

(21) Appl. No.: 10/751,856

(22) Filed: Jan. 6, 2004

(65) Prior Publication Data

US 2004/0134217 A1 Jul. 15, 2004

(30) Foreign Application Priority Data

Jan. 9, 2003 (JP) .............................. 2003-003263

(51) Int. Cl.[7] .......................... F25D 17/06; F25B 41/04; F25B 13/00; B60H 1/32
(52) U.S. Cl. ...................... 62/324.1; 62/324.6; 62/244; 62/160; 62/93
(58) Field of Search ........................... 62/324.1, 324.6, 62/160, 244, 223, 93, 239, 243, 159

(56) References Cited

U.S. PATENT DOCUMENTS 5,526,650 A   6/1996 Iritani et al.
5,819,551 A * 10/1998 Fukumoto et al. ......... 62/324.1

FOREIGN PATENT DOCUMENTS

| JP | 52-113546 | 9/1977 |
|----|-----------|--------|
| JP | 63-87453  | 6/1988 |
| JP | 6-206438  | 7/1994 |

* cited by examiner

Primary Examiner—Chen Wen Jiang
(74) Attorney, Agent, or Firm—Harness, Dickey & Pierce, PLC

(57) ABSTRACT

When a dehumidifying and heating operation is set in an air conditioner, refrigerant is circulated from a compressor to the compressor through a first exterior heat exchanger, a decompression device, an interior heat exchanger, an another decompression device, an inner heat exchanger and a second exterior heat exchanger, in this order. Further, by controlling a throttle opening degree of the another decompression device, a refrigerant temperature in the interior heat exchanger can be set higher than that in the second exterior heat exchanger. Thus, even when the interior heat exchanger is controlled to a temperature to be not frosted, heat can be absorbed from outside air in the second exterior heat exchanger. Accordingly, when an outside air temperature is low, by setting the dehumidifying and heating operation, air to be blown into a compartment can be dehumidified while sufficiently increasing heating capacity.

14 Claims, 7 Drawing Sheets

FIRST DEHUMIDIFYING AND HEATING

SECOND DEHUMIDIFYING AND HEATING

AIR CONDITIONER WITH DEHUMIDIFYING AND HEATING OPERATION

CROSS-REFERENCE TO RELATED APPLICATION

This application is related to and claims priority from Japanese Patent Application No. 2003-3263 filed on Jan. 9, 2003, the content of which is hereby incorporated by reference.

FIELD OF THE INVENTION

The present invention relates to an air conditioner with a dehumidifying and heating operation. The air conditioner of the present invention is effectively used for an electric vehicle.

BACKGROUND OF THE INVENTION

In an air conditioner disclosed in U.S. Pat. No. 5,526,650 (corresponding to JP-A-8-40056), when a dehumidifying and heating operation is performed, high pressure refrigerant discharged from a compressor is circulated into a first interior heat exchanger to heat air to be blown into a passenger compartment. Then, refrigerant flowing out of the first interior heat exchanger is decompressed, and the decompressed refrigerant is circulated into an exterior heat exchanger and a second interior heat exchanger in this order, so that air to be blown into the passenger compartment is cooled and dehumidified by the second interior heat exchanger. In this way, in the dehumidifying and heating operation, air is cooled lower than its dew-point temperature to be dehumidified, and the dehumidified air is heated.

However, if the dehumidifying and heating operation is performed when an outside air temperature is lower than 0° C., that is, when an air conditioning load (heating load) is large, the following problems occur. In this air conditioner, refrigerant flowing out of the exterior heat exchanger is decompressed, and the decompressed refrigerant is circulated into the second interior heat exchanger, so that the refrigerating capacity of the second interior heat exchanger can be obtained. At this time, a refrigerant temperature in the exterior heat exchanger is higher than that in the second interior heat exchanger. Further, a refrigerant pressure in the second interior heat exchanger is required to be controlled at a pressure corresponding to a temperature (e.g., 2–3° C.) where the second interior heat exchanger is not frosted. Thus, the refrigerant pressure in the exterior heat exchanger necessarily becomes higher than that in the second interior heat exchanger.

In a case where the outside air temperature is about 0° C., the refrigerant temperature in the exterior heat exchanger may become higher than the outside air temperature. In this case, the exterior heat exchanger is operated as a radiator. Accordingly, when the outside air temperature is low, a heat absorption amount in the exterior heat exchanger is reduced due to a decrease of an outside air temperature, and a heat absorbing operation cannot be performed in the exterior heat exchanger. As a result, air to be blown into a passenger compartment may be not sufficiently heated.

SUMMARY OF THE INVENTION

In view of the above problem, it is an object of the present invention to provide an air conditioner capable of dehumidifying air to be blown into a passenger compartment while sufficiently increasing heating capacity.

According to an aspect of the present invention, an air conditioner includes a compressor for sucking and compressing refrigerant, a first heat exchanger for performing heat exchange between the refrigerant discharged from the compressor and air to be blown into a compartment, a decompression device for decompressing refrigerant from the first heat exchanger, a second heat exchanger for performing a heat exchange between the refrigerant from the decompression device and air to be blown into the compartment, and a third heat exchanger for performing a heat exchange between the refrigerant and outside air outside the compartment. In the air conditioner, a circulation means is provided for circulating the refrigerant decompressed in the decompression device into the second heat exchanger and the third heat exchanger in this order. Thus, a refrigerant temperature in the second heat exchanger can be set to be higher than a refrigerant temperature in the third heat exchanger.

Accordingly, even when the second heat exchanger is controlled at a temperature (e.g., 2–3° C.) to be not frosted, heat can be effectively absorbed from outside air in the third heat exchanger. Thus, heat absorbed in the second and third heat exchangers is radiated to air to be blown into the passenger compartment. As a result, even when an outside air temperature is low, that is, even when an air conditioning load (i.e., heating load) is large, air to be blown into the passenger compartment can be dehumidified while heating capacity can be sufficiently increased.

According to another aspect of the present invention, an air conditioner includes a switching device for switching between a first circulation state where refrigerant discharged from the compressor flows through the first heat exchanger, the second heat exchanger and the third heat exchanger in this order, and a second circulation state where the refrigerant discharged from the compressor flows through the first heat exchanger, the third heat exchanger and the second heat exchanger in this order. Further, a first decompression device is provided for decompressing refrigerant flowing out of the first heat exchanger in the first circulation state, and a second decompression device is provided for decompressing refrigerant flowing out of the third heat exchanger in the second circulation state. Thus, in the air conditioner where one of the first and second circulation states can be set, the compartment such as a passenger compartment of a vehicle can be sufficiently heated while being dehumidified in the first circulation state.

For example, in the first circulation state, refrigerant flowing out of the second heat exchanger is decompressed by the second decompression device, and is introduced into the third heat exchanger to absorb heat from outside air in the third heat exchanger. Further, in the second circulation state, the first decompression device decompresses refrigerant flowing from the first heat exchanger so as to adjust a heat amount radiated in the first heat exchanger.

The first heat exchanger can be disposed to indirectly perform the heat exchange between refrigerant and air to be blown into the compartment, through a medium. Alternatively, the first heat exchanger and the second heat exchanger are disposed in an air conditioning case, to directly perform the heat exchange between refrigerant and air to be blown into the compartment. In this case, for example, the first heat exchanger is disposed in the air conditioning case at a downstream air side of the second heat exchanger.

According to a further another aspect of the present invention, in the first circulation state, refrigerant discharged from the compressor flows through the first heat exchanger, the second heat exchanger and the third heat exchanger, in this order. Further, in the second circulations state, the refrigerant discharged from the compressor is supplied to the first heat exchanger and the third heat exchanger while the first heat exchanger and the third heat exchanger are connected in series with respect to a refrigerant flow, and the refrigerant after passing through the first heat exchanger and the third heat exchanger is decompressed and then is circulated into the second heat exchanger. Thus, even when the heating load is large when the outside air temperature is low, the compartment can be sufficiently dehumidified while the heating capacity for heating the compartment can be sufficiently increased in the air conditioner where one of the first and second circulation states can be set.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

The first embodiment of the present invention will be now described with reference to FIGS. 1A–6B. In the first embodiment, a vapor-compression refrigerant cycle of the present invention is typically applied to an air conditioner for an electric vehicle. In the vapor-compression refrigerant cycle, carbon dioxide is used as refrigerant.

Figure 1A:
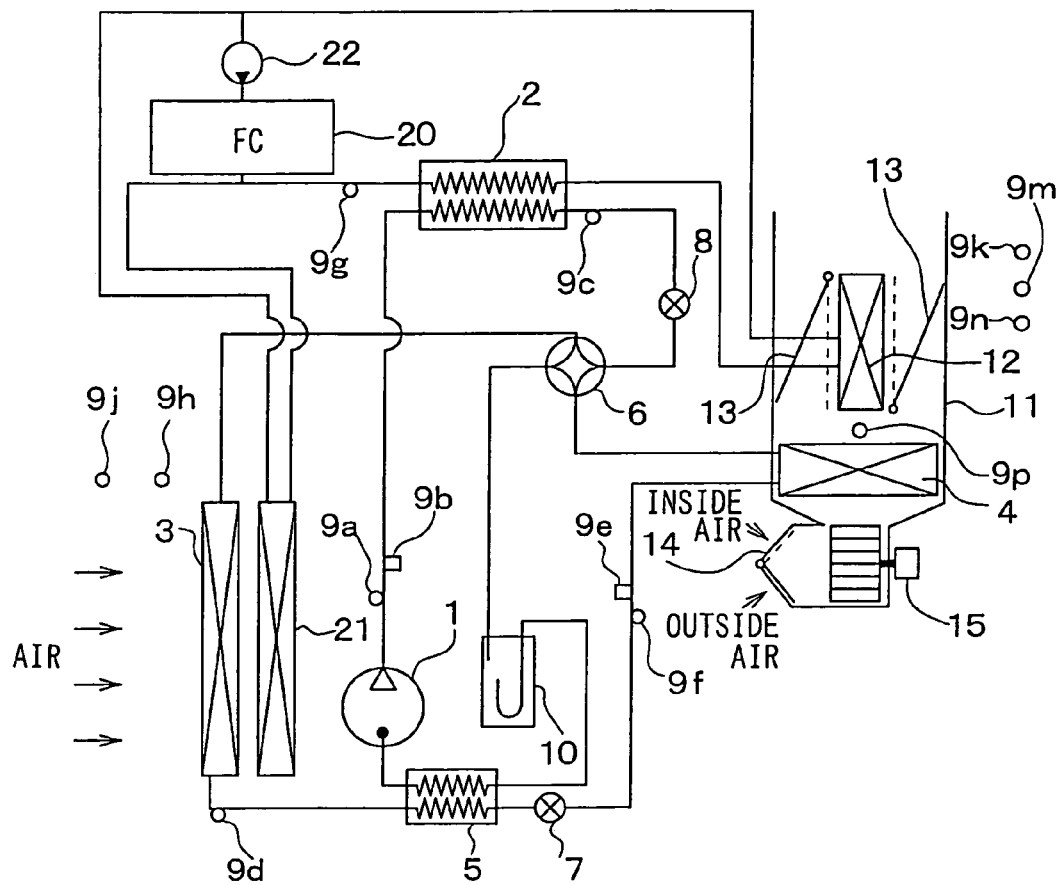
FIG. 1A is a schematic diagram showing an air conditioner with a vapor-compression refrigerant cycle according to a first embodiment of the present invention.
Figure 1B:
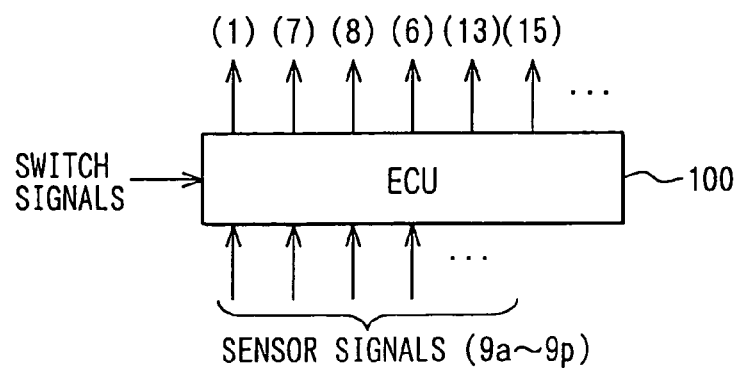
FIG. 1B is a block diagram showing a control unit of the air conditioner.

In the electric vehicle, a fuel cell (FC stack) 20 shown in FIG. 1A generates electric power by using a chemical reaction between oxygen and hydrogen, and the generated electric power is supplied to an electric motor (not shown) for running the electric vehicle. In FIG. 1A, a radiator 21 is a heat exchanger that cools cooling water for heating or cooling the fuel cell 20 by performing a heat exchange between the cooling water and outside air. A pump 22 is an electric pump for pumping and circulating the cooling water in a cooling water circuit.

A compressor 1 sucks and compresses refrigerant. In this embodiment, an inverter-control electric compressor is adopted as the compressor 1. A first exterior heat exchanger 2 is disposed to perform a heat exchange between refrigerant discharged from the compressor 1 and cooling water to be supplied from the fuel cell 20 to a heater 12 described later. A second exterior heat exchanger 3 is disposed to perform a heat exchange between refrigerant and outside air. In FIG. 1A, a flow of refrigerant is parallel with a flow of cooling water in the same flow direction, in the first exterior heat exchanger 2. However, actually, in the first exterior heat exchanger 2, the flow direction of the refrigerant is set opposite to the flow direction of the cooling water, thereby improving a heat exchange capacity of the first exterior heat exchanger 2.

An interior heat exchanger 4 is disposed to perform a heat exchange between refrigerant and air to be blown into the passenger compartment, and an inner heat exchanger 5 is disposed to perform a heat exchange between low-pressure refrigerant to be sucked into the compressor 1 and high-pressure refrigerant before being decompressed.

A switching valve 6 is disposed to switch between a first circulation where high-pressure refrigerant before being decompressed flows toward the second exterior heat exchanger 3, and a second circulation where the high-pressure refrigerant before being decompressed flows toward the interior heat exchanger 4.

Each of first and second decompression devices 7, 8 continuously changes its throttle open degree from an entire open state where a pressure loss is substantially not generated and a predetermined open state where refrigerant is decompressed and expanded to a predetermined degree. Each throttle open degree of the first and second decompression devices 7, 8 is controlled by an electronic control unit (ECU) 100.

The ECU 100 inputs detection values of a discharge refrigerant temperature sensor 9a, a discharge refrigerant pressure sensor 9b, a first exterior refrigerant temperature sensor 9c, a second exterior refrigerant temperature sensor 9d, an interior refrigerant pressure sensor 9e, an interior refrigerant temperature sensor 9f, a water temperature sensor 9g, an outside air temperature sensor 9h, an outside humidity sensor 9j, an inside air temperature sensor 9k, a sunlight sensor 9m, an inside humidity sensor 9n and an interior air temperature sensor 9p. The discharge refrigerant temperature sensor 9a detects a temperature of refrigerant discharged from the compressor 1, and the discharge refrigerant pressure sensor 9b detects a pressure of the discharged refrigerant from the compressor 1. The first exterior refrigerant temperature sensor 9c detects a temperature of refrigerant flowing out of the first exterior heat exchanger 2, and the second exterior refrigerant temperature sensor 9d detects a temperature of refrigerant flowing out of the second exterior heat exchanger 3. The interior refrigerant pressure sensor 9e detects a pressure of refrigerant flowing out of the interior heat exchanger 4, and the interior refrigerant temperature sensor 9f detects a temperature of the refrigerant flowing out of the interior heat exchanger 4. The water temperature sensor 9g detects a temperature of cooling water flowing into the first exterior heat exchanger 2, and the outside air temperature sensor 9h detects a temperature of outside air outside the passenger compartment. The outside humidity sensor 9j detects a relative humidity of outside air, and the inside air temperature sensor 9k detects a temperature of inside air of the passenger compartment. The sunlight sensor 9m detects an amount of sunlight radiated into the passenger compartment, and the inside humidity sensor 9n detects a relative humidity of inside air of the passenger compartment. The interior air temperature sensor 9p detects a temperature of air immediately after passing through the interior heat exchanger 4.

An accumulator 10 separates refrigerant into gas refrigerant and liquid refrigerant, and stores the separated liquid refrigerant as excess refrigerant. Further, the gas refrigerant separated in the accumulator 10 is supplied to a suction side of the compressor 1.

On the other hand, an air conditioning case 11 has therein an air passage through which air flows into the passenger compartment. Further, the air conditioning case 11 contains the interior heat exchanger 4 and the heater 12 downstream of the interior heat exchanger 4. The heater 12 heats air to be blown into the passenger compartment by using the cooling water of the fuel cell 20 as a heat source. In the first embodiment, a first heat exchanger of the present invention is constructed with the heater 12 and the first exterior heat exchanger 2. A heat exchange between refrigerant and air to be blown into the passenger compartment is indirectly performed in the first exterior heat exchanger 2 and the heater 12, through cooling water. Further, a second heat exchanger in the present invention corresponds to the interior heat exchanger 4, and a third heat exchanger in the present invention corresponds to the second exterior heat exchanger 3.

The air conditioning case 11 includes an inside-outside air selecting unit 14 at its most upstream side. The inside-outside air selecting unit 14 adjusts an inside air amount and an outside air amount to be introduced into the air conditioning case 11. A blower 15 is disposed to blow the introduced air into the passenger compartment. Further, the air conditioning case 11 has air outlets and an air-outlet mode switching unit (not shown) at its most downstream side. Conditioned air is blown from the air outlets into the passenger compartment, and the air outlets are selectively opened and closed by the air-outlet mode switching unit.

Air blown by the blower 15 passes through the interior heat exchanger 4. Thereafter, a part of air after passing through the interior heat exchanger 4 passes through the heater 12, and the other part of air after passing through the interior heat exchanger 4 bypasses the heater 12. A ratio between an air amount passing through the heater 12 and an air amount bypassing the heater 12 is adjusted by an air mixing door 13, so that a temperature of conditioned air to be blown into the passenger compartment can be adjusted. A rotational speed of the compressor 1, the air mixing door 13, the inside-outside air selecting unit 14, the blower 15 and the air-outlet mode switching unit are controlled by the ECU 100. In the ECU 100, a target air temperature TAO to be blown into the passenger compartment is calculated based on the detection values of the outside air temperature sensor 9h, the inside air temperature sensor 9k and the sunlight sensor 9m, a set temperature set by a passenger. Then the ECU 100 can perform various controls by using the calculated target air temperature TAO.

Next, operation of the air conditioner according to the first embodiment will be described.

1. Cooling Operation (FIG. 2)

Figure 2:
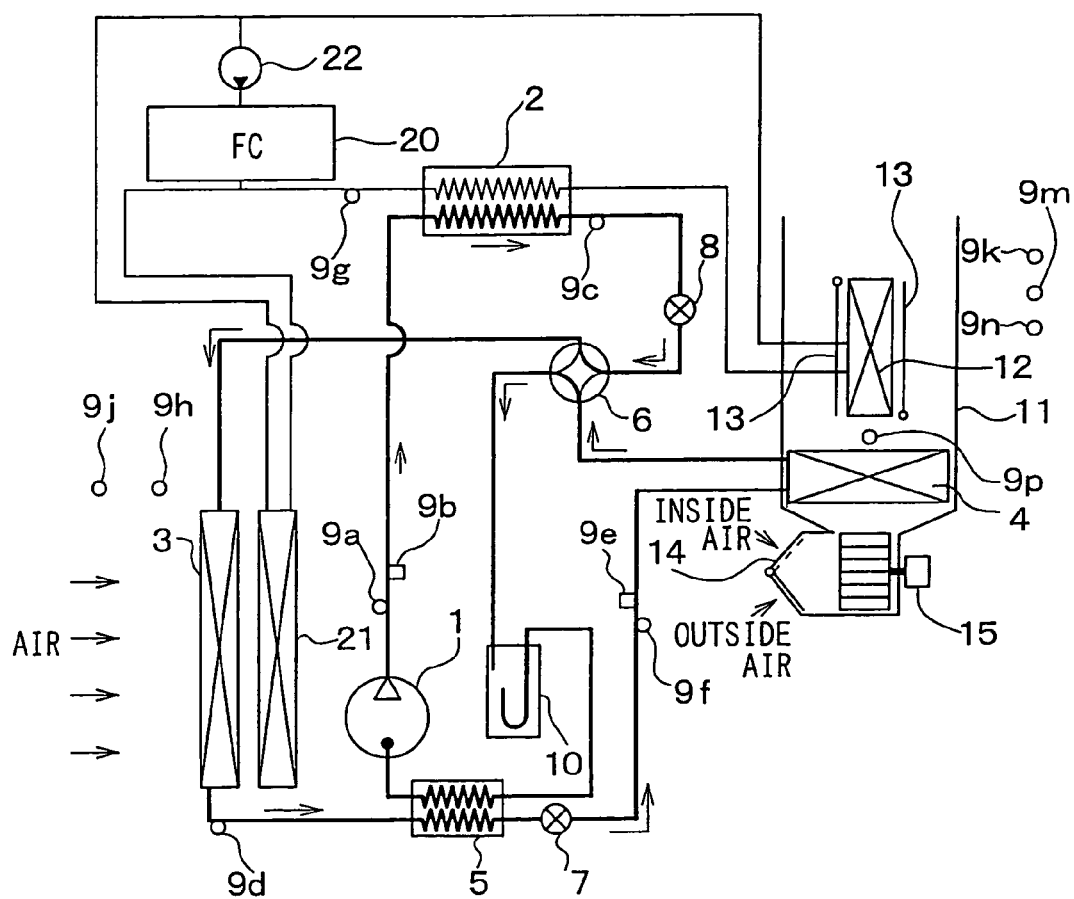
FIG. 2 is a schematic diagram showing a cooling operation of the air conditioner according to the first embodiment.

When the target air temperature TAO is equal to or lower than a predetermined low temperature, the cooling operation shown in FIG. 2 is performed. When the cooling operation is set, a core surface of the heater 12 is closed by the air mixing door 13, so that a warm air amount to be blown from the heater 12 into the passenger compartment is set at zero. In this state, refrigerant is circulated from the compressor 1 to the compressor 1 through the first exterior heat exchanger 2, the second decompression device 8, the switching valve 6, the second exterior heat exchanger 3, the inner heat exchanger 5, the first decompression device 7, the interior heat exchanger 4, the accumulator 10 and the inner heat exchanger 5, in this order.

At this time, the throttle open degree of the second decompression device 8 is entirely opened so that refrigerant is not decompressed by the second decompression device 8. Further, the throttle open degree of the first decompression device 7 is controlled so that a refrigerant pressure detected by the discharge refrigerant pressure sensor 9b becomes a target high pressure P0 that is determined based on the detection value of the second exterior refrigerant temperature sensor 9d. In this way, in the vapor-compression refrigerant cycle, refrigerant in the interior heat exchanger 4 absorbs heat from air to be blown into the passenger compartment, and the absorbed heat of refrigerant is radiated in the first and second exterior heat exchangers 2, 3.

A part of heat absorbed in the interior heat exchanger 4 is radiated in the first exterior heat exchanger 2. In the cooling operation, the core surface of the heater 12 is closed by the air mixing door 13. Therefore, this heat radiated in the first exterior heat exchanger 2 is not radiated into air to be blown into the passenger compartment, and is radiated to the radiator 21. The target high pressure P0 is a pressure where a performance of coefficient (COP) of the vapor-compression refrigerant cycle becomes substantially maximum. Further, the target high pressure P0 is changed in accordance with heat radiation performance at a high pressure side. Therefore, in the cooling operation, the target high pressure P0 is determined based on a temperature detected by the second exterior refrigerant temperature sensor 9d.

In the cooling operation, the rotational speed of the compressor 1 is controlled, so that the temperature detected by the interior air temperature sensor 9p becomes the target air temperature TAO.

Figure 3:
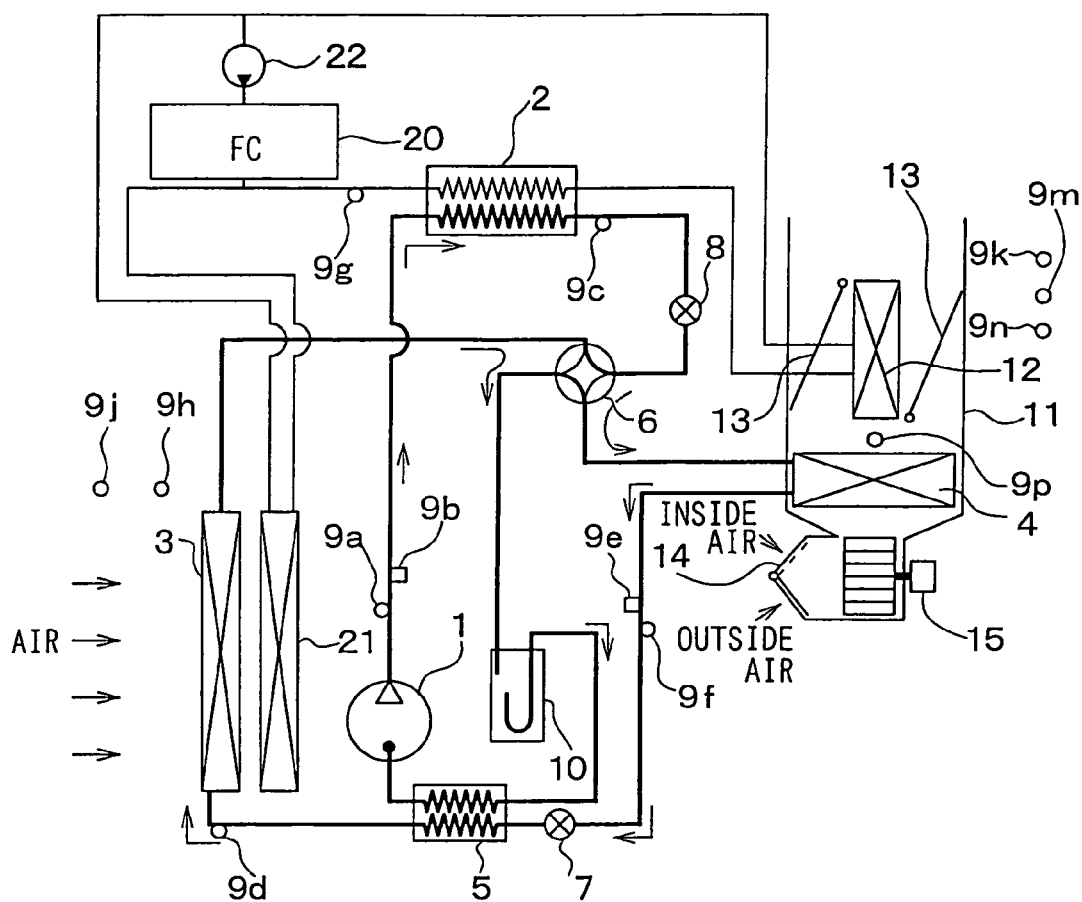
FIG. 3 is a schematic diagram showing a heating operation of the air conditioner according to the first embodiment.

2. Heating Operation (FIG. 3)

The heating operation is performed when the target air temperature TAO is equal to or higher than a predetermined high temperature. In the heating operation, a bypass passage, through which air bypasses the heater 12, is closed by the air mixing door 13. In this state, refrigerant is circulated from the compressor 1 to the compressor 1 through the first exterior heat exchanger 2, the second decompression device 8, the switching valve 6, the interior heat exchanger 4, the first decompression device 7, the inner heat exchanger 5, the second exterior heat exchanger 3, the switching valve 6 and the accumulator 10, in this order.

In the heating operation, the throttle open degree of the second decompression device 8 is entirely opened so that refrigerant is not decompressed by the second decompression device 8. Further, the throttle open degree of the first decompression device 7 is controlled so that the refrigerant pressure detected by the interior refrigerant pressure sensor 9e becomes a target high pressure P1 that is determined based on the detection value of the interior refrigerant temperature sensor 9f. In this way, refrigerant absorbs heat from outside air to be evaporated in the second exterior heat exchanger 3, and the absorbed heat of the evaporated refrigerant is radiated in the first exterior heat exchanger 2 and the interior heat exchanger 4. Thus, air to be blown into the passenger compartment is heated by the interior heat exchanger 4 and the heater 12.

Further, cooling water (hot water), to be supplied to the heater 12, is heated by the fuel cell 20 and the first exterior heat exchanger 2. Therefore, a temperature of cooling water to be supplied to the heater 12 is determined based on heating capacity of the first exterior heat exchanger 2. Therefore, in the first embodiment, the rotational speed of the compressor 1 is controlled so that the temperature of cooling water to be supplied to the heater 12 is set at a target water temperature TWO.

The target air temperature TAO is multiplied by a heat-exchange efficiency Y in the heater 12, so that the target water temperature TWO (i.e., TWO=TAO×Y) can be calculated. Specifically, a change value Δf of the rotational speed of the compressor 1 is determined by using a fuzzy theory based on a temperature difference between the target water temperature TWO and a water temperature detected by the water temperature sensor 9g, and a change rate of this temperature difference.

In the heating operation, refrigerant after being decompressed flows into both of refrigerant passages of the inner heat exchanger 5, at the side of the compressor 1 and the side of the first decompression device 7. Therefore, a heat exchange is substantially not performed in the inner heat exchanger 5. When the temperature difference between the target water temperature TWO and the water temperature detected by the water temperature sensor 9g is equal to or lower than a predetermined temperature, or when the water temperature detected by the water temperature sensor 9g is equal to or higher than the target water temperature TWO, the operation of the compressor 1 is stopped, and additional heating operation due to the vapor-compression refrigerant cycle is stopped. In this case, cooling water flowing into the heater 12 is not heated by the vapor-compression refrigerant cycle.

Figure 4:
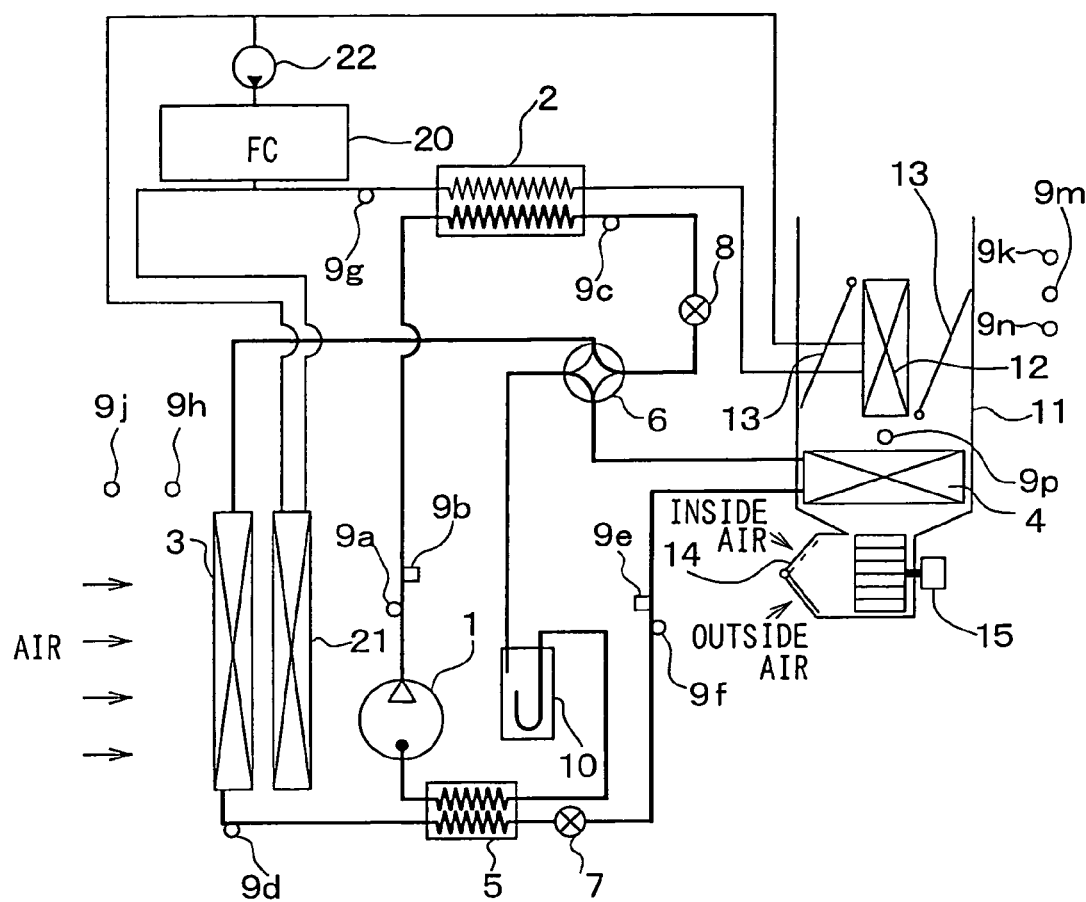
FIG. 4 is a schematic diagram showing a first dehumidifying and heating operation of the air conditioner according to the first embodiment.

3. First Dehumidifying and Heating Operation (FIG. 4)

The first dehumidifying and heating operation is performed when an air conditioning load (i.e., heating load) is relatively small, that is, when the outside air temperature detected by the outside air temperature sensor 9h is equal to or higher than a predetermined outside temperature (e.g., 20° C.), and when the target air temperature TAO is equal to or higher than a predetermined target temperature. In this first dehumidifying and heating operation, refrigerant is circulated in the same refrigerant path as in the cooling operation while the bypass passage is closed by the air mixing door 13. Specifically, refrigerant is circulated from the compressor 1 to the compressor 1 through the first exterior heat exchanger 2, the second decompression device 8, the switching valve 6, the second exterior heat exchanger 3, the inner heat exchanger 5, the first decompression device 7, the interior heat exchanger 4, the switching valve 6 and the accumulator 10, in this order.

At this time, the throttle open degree of the second decompression device 8 is adjusted, thereby adjusting a heat radiation amount in the second exterior heat exchanger 3, that is, a heat radiation amount in the heater 12. The throttle open degree of the first decompression device 7 is adjusted, thereby adjusting a refrigerant temperature in the interior heat exchanger 4, and adjusting a cooling-dehumidifying value in the interior heat exchanger 4. The compressor 1 is controlled in the same manner as in the cooling operation. In this way, air to be blown into the passenger compartment can be cooled and dehumidified by evaporating refrigerant in the interior heat exchanger 4, and can be indirectly heated through the cooling water in the first exterior heat exchanger 2. Therefore, air cooled and dehumidified by the interior heat exchanger 4 is heated in the heater 12 by using the cooling water heated in the first exterior heat exchanger 2. Thus, air to be blown into the passenger compartment can be heated while being dehumidified.

Figure 5:
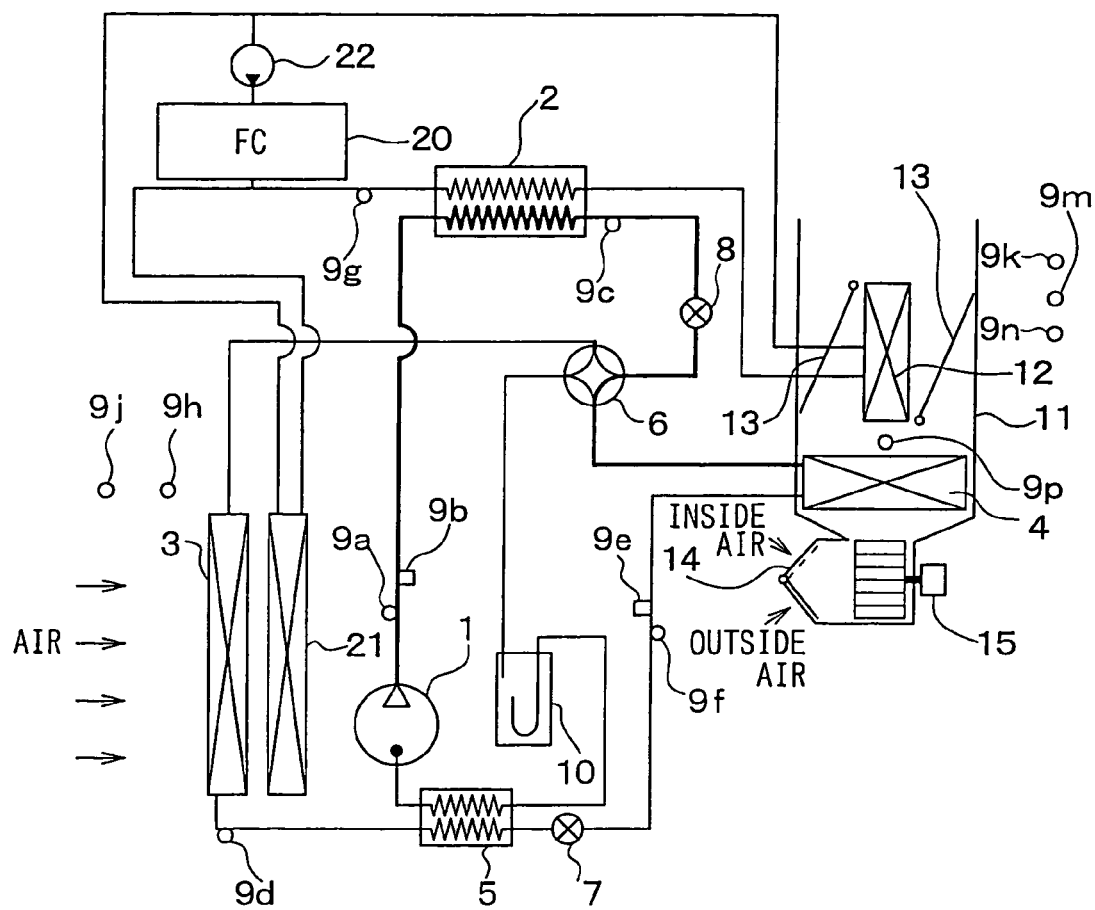
FIG. 5 is a schematic diagram showing a second dehumidifying and heating operation of the air conditioner according to the first embodiment.

4. Second Dehumidifying and Heating Operation (FIG. 5)

The second dehumidifying and heating operation is performed when the air conditioning load (i.e., heating load) is relatively large, that is, when the outside air temperature detected by the outside air temperature sensor 9h is lower than the predetermined outside temperature (e.g., 20° C.), and when the target air temperature TAO is equal to or higher than the predetermined target temperature. Refrigerant is circulated in the same refrigerant path as in the heating operation while the bypass passage is closed by the air mixing door 13. Specifically, refrigerant is circulated from the compressor 1 to the compressor 1 through the first exterior heat exchanger 2, the second decompression device 8, the switching valve 6, the interior heat exchanger 4, the first decompression device 7, the inner heat exchanger 5, the second exterior heat exchanger 3, the switching valve 6 and the accumulator 10, in this order.

At this time, the throttle open degree of the second decompression device 8 is adjusted, thereby adjusting a refrigerant temperature in the interior heat exchanger 4, and adjusting the cooling-dehumidifying value in the interior heat exchanger 4. The throttle open degree of the first decompression device 7 is adjusted, thereby adjusting a heat absorption value in the second exterior heat exchanger 3. The throttle opening degree of the first decompression device 7 is controlled by the ECU 100 such that a refrigerant temperature in the interior heat exchanger 4 becomes higher than a refrigerant temperature in the second exterior heat exchanger 3.

The compressor 1 is controlled in the same manner as in the heating operation. In this way, air to be blown into the passenger compartment can be cooled and dehumidified by evaporating refrigerant in the interior heat exchanger 4 while being indirectly heated in the heater 12 by using cooling water from the first exterior heat exchanger 2. Therefore, air cooled and dehumidified by the interior heat exchanger 4 is heated by the heater 12, so that air can be heated while being dehumidified.

5. Air Mixing Operation

In this embodiment, originally, the temperature of air to be blown into the passenger compartment is adjusted by adjusting the throttle open degrees of the decompression devices 7, 8 while the core surface of the heater 12 is entirely closed or opened. However, for example, in a transition period directly after being switched from the cooling operation to the heating operation, the open degree of the air mixing door 13 is adjusted, thereby adjusting the temperature of air to be blown into the passenger compartment. Specifically, when the target air temperature TAO rapidly changes, the open degree of the air mixing door 13 is adjusted based on a ratio (TAO−TE)/(TAG−TE). Here, TE is the air temperature detected by the interior air temperature sensor 9p, and TAG is a temperature of air directly after passing through the heater 12.

Figure 6A:
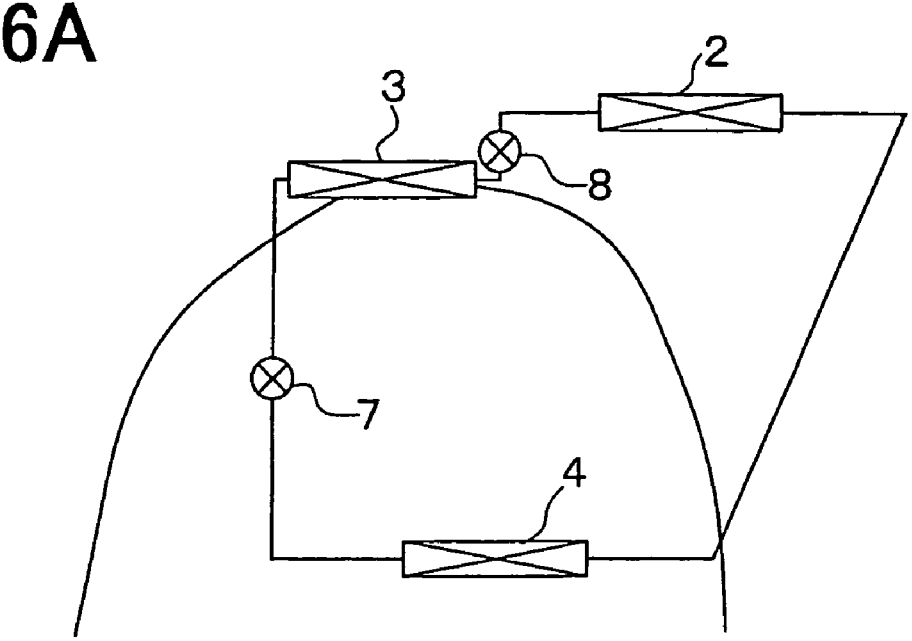
FIG. 6A is a p-h diagram (Mollier diagram) in the first dehumidifying and heating operation.
Figure 6B:
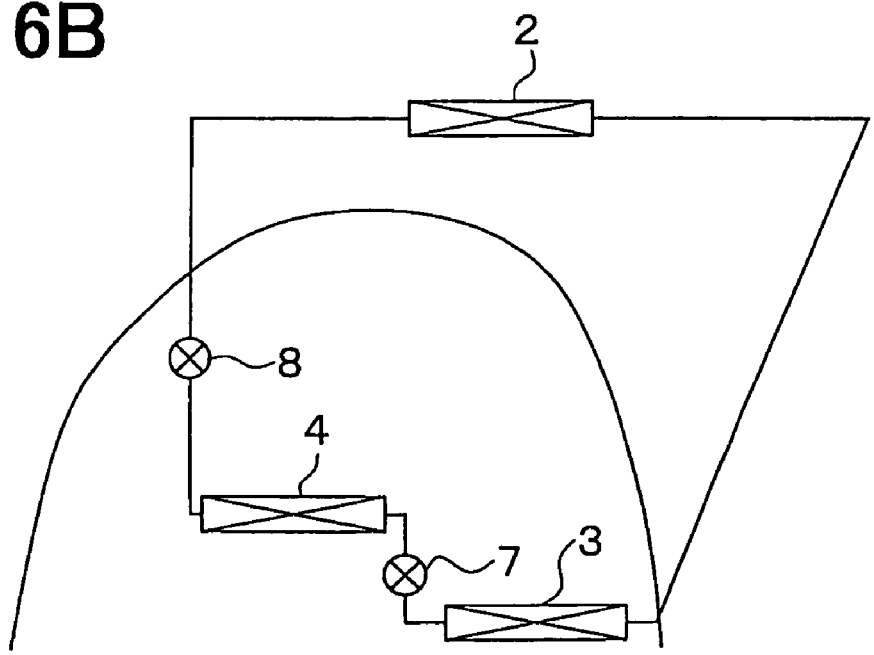
FIG. 6B is a p-h diagram in the second dehumidifying and heating operation.

Next, advantages of the air conditioner in the first embodiment will be described. FIG. 6A is a p-h diagram (Mollier diagram) in the first dehumidifying and heating operation, and FIG. 6B is a p-h diagram in the second dehumidifying and heating operation. In the first dehumidifying and heating operation, refrigerant pressure in the interior heat exchanger 4 becomes lowest in the vapor compression refrigerant cycle. On the other hand, in the second dehumidifying and heating operation, the refrigerant pressure in the interior heat exchanger 4 becomes higher than the refrigerant pressure in the second exterior heat exchanger 3. Therefore, in the second dehumidifying and heating operation, the refrigerant temperature in the interior heat exchanger 4 can be set higher than the refrigerant temperature in the second exterior heat exchanger 3. Accordingly, even when the interior heat exchanger 4 is controlled in a refrigerant temperature range (e.g., 2–3° C.) in which the interior heat exchanger 4 is not frosted, heat can be absorbed from outside air in the second exterior heat exchanger 3. As a result, heat absorbed in both of the second exterior heat exchanger 3 and the interior heat exchanger 4 is radiated to the first exterior heat exchanger 2, that is, to air to be blown from the heater 12 into the passenger compartment.

On the other hand, in the first dehumidifying and heating operation, the refrigerant pressure in the interior heat exchanger 4 becomes lowest, the refrigerant temperature in the second exterior heat exchanger 3 becomes higher than the refrigerant temperature in the interior heat exchanger 4, as in the above related art disclosed in U.S. Pat. No. 5,526,650. Therefore, in this case, when the outside air temperature is around 0° C., the refrigerant temperature in the second exterior heat exchanger 3 becomes higher than the outside air temperature. As a result, the second exterior heat exchanger 3 operates as a radiator, but is not used as a heat absorber.

As described above, in the first embodiment, when the outside air temperature is low, that is, when an air conditioning load (i.e., heating load) is large, the second dehumidifying and heating operation is set. In this case, air to be blown into the passenger compartment can be dehumidified while heating capacity can be sufficiently increased. On the other hand, when the outside air temperature is relatively high, that is, when the air conditioning load (i.e., heating load) is low, the first dehumidifying and heating operation is set. In this way, air to be blown into the passenger compartment can be dehumidified while heating capacity can be sufficiently increased.

(Second Embodiment)

Figure 7:
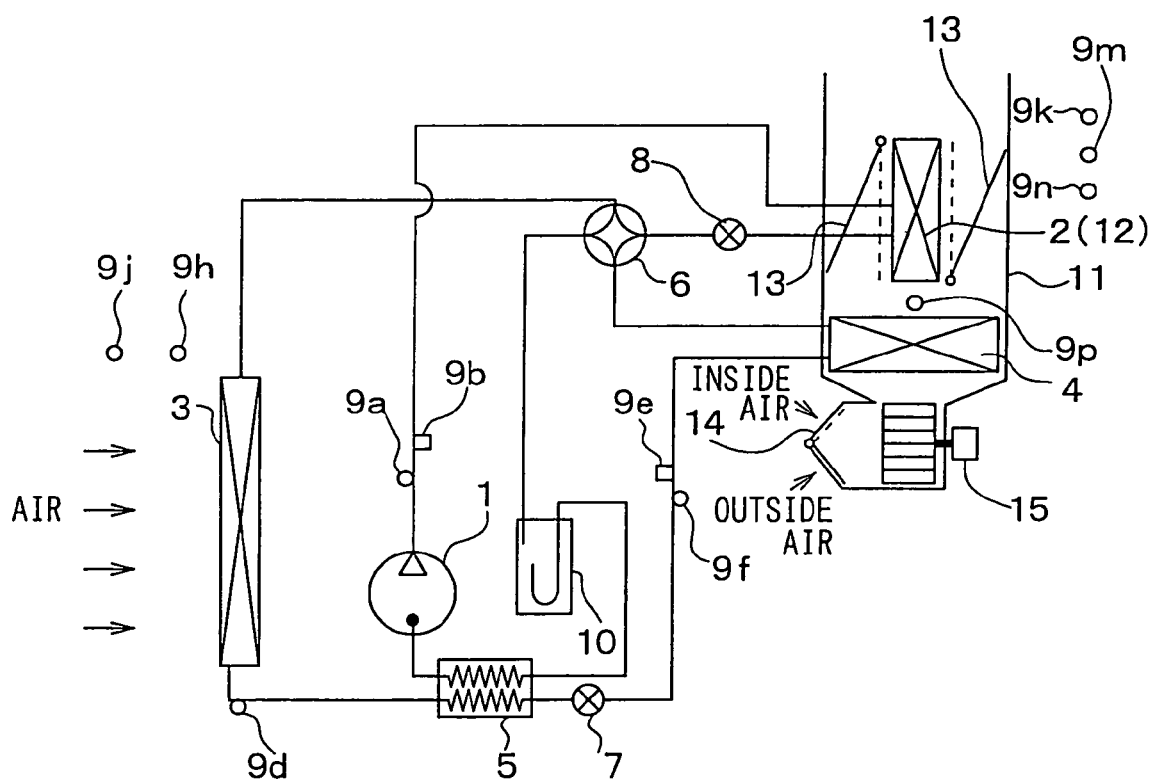
FIG. 7 is a schematic diagram showing an air conditioner with a vapor-compression refrigerant cycle according to a second embodiment of the present invention.

In the above-described first embodiment, heat of high-temperature refrigerant discharged from the compressor 1 is supplied to cooling water flowing into the heater 12, in the first exterior heat exchanger 2. In this way, the heat is indirectly supplied to air to be blown into the passenger compartment. However, in the second embodiment, as shown in FIG. 7, the heat of the high-temperature refrigerant discharged from the compressor 1 is directly supplied to air to be blown into the passenger compartment, without through a medium such as cooling water. Accordingly, when the second dehumidifying and heating operation is set, refrigerant discharged from the compressor 1 flows into the heater 12 (heat exchanger 2) disposed in the air conditioning case 11. Therefore, air passing through the heater 2 can be directly heated by the high-temperature refrigerant discharged from the compressor 1. Refrigerant flowing from the heater 12 (heat exchanger 2) is decompressed in the second decompression device 8, and the decompressed refrigerant flows into the interior heat exchanger 4. Therefore, air passing through the interior heat exchanger 4 is cooled and dehumidified. Then, refrigerant from the interior heat exchanger 4 is decompressed in the first decompression device 7, and is introduced into the exterior heat exchanger 3. Similarly to the above-described first embodiment, the throttle opening degree of the first decompression device 7 is adjusted so that the refrigerant temperature in the interior heat exchanger 4 becomes higher than the refrigerant temperature in the exterior heat exchanger 3.

Accordingly, even when the interior heat exchanger 4 is controlled in a refrigerant temperature range (e.g., 2–3° C.) in which the interior heat exchanger 4 is not frosted, heat can be absorbed from outside air in the exterior heat exchanger 3. As a result, heat absorbed in both of the exterior heat exchanger 3 and the interior heat exchanger 4 is radiated to the heater 12 (heat exchanger 2). Thus, air can be effectively heated in the heater 12, while being dehumidified in the interior heat exchanger.

In the second embodiment, the other parts are similar to those of the above-described first embodiment, and advantages described in the first embodiment can be obtained.

(Other Embodiments)

Although the present invention has been fully described in connection with the preferred embodiments thereof with reference to the accompanying drawings, it is to be noted that various changes and modifications will become apparent to those skilled in the art.

For example, in the above-described embodiments, carbon dioxide is used as refrigerant, and refrigerant pressure discharged from the compressor 1 is set higher than the critical pressure of refrigerant, thereby ensuring required air conditioning performance. However, in the present invention, for example, other fluid such as freon can be used as the refrigerant, and the refrigerant pressure discharged from the compressor 1 can be set lower than the critical pressure of refrigerant.

In the above-described embodiments, the first dehumidifying and heating operation and the second dehumidifying and heating operation are provided, that is, a first circulation state and a second circulation state in the present invention are provided. However, the vapor-compression refrigerant cycle can be set to have at least the second dehumidifying and heating operation.

In the first dehumidifying and heating operation according to the above embodiments, refrigerant flowing into the second exterior heat exchanger 3 is decompressed by the second decompression device 8. However, in some range of the air conditioning load, the refrigerant may be not decompressed by the second decompression device 8. In the second dehumidifying and heating operation according to the above embodiments, refrigerant flowing into the second exterior heat exchanger 3 is decompressed. However, in some range of the air conditioning load, the refrigerant may be not decompressed by the first decompression device 7. Further, the inner heat exchanger 5 may be eliminated.

Such changes and modifications are to be understood as being within the scope of the present invention as defined by the appended claims.

What is claimed is:

1. An air conditioner comprising:
   a compressor for sucking and compressing refrigerant;
   a first heat exchanger for performing heat exchange between the refrigerant discharged from the compressor and air to be blown into a compartment;
   a decompression device for decompressing refrigerant from the first heat exchanger;
   a second heat exchanger for performing a heat exchange between the refrigerant from the decompression device and air to be blown into the compartment;
   a third heat exchanger for performing a heat exchange between the refrigerant and outside air outside the compartment; and
   a circulation means for circulating the refrigerant decompressed in the decompression device into the second heat exchanger and the third heat exchanger, in this order.

2. The air conditioner according to claim 1, wherein the first heat exchanger is disposed to indirectly perform the heat exchange between refrigerant and air to be blown into the compartment, through a medium.

3. The air conditioner according to claim 1, further comprising
an air conditioning case for defining an air passage through which air flows into the passenger compartment,
wherein the first heat exchanger and the second heat exchanger are disposed in the air conditioning case to directly perform the heat exchange between refrigerant and air to be blown into the compartment.

4. The air conditioner according to claim 3, wherein the first heat exchanger is disposed in the air conditioning case at a downstream air side of the second heat exchanger.

5. The air conditioner according to claim 1, further comprising
an air adjusting member for adjusting an amount of air passing through the first heat exchanger, to be blown into the passenger compartment.

6. The air conditioner according to claim 1, wherein carbon dioxide is used as refrigerant.

7. The air conditioner according to claim 1, wherein,
a refrigerant pressure discharged from the compressor becomes equal to or higher than a critical pressure of the refrigerant, in a super-critical operation mode.

8. An air conditioner, comprising:
a compressor for sucking and compressing refrigerant;
first and second heat exchangers for performing a heat exchange between refrigerant and air to be blown into a compartment;
a third heat exchanger for performing a heat exchange between refrigerant and outside air;
a switching device for switching between a first circulation state where refrigerant discharged from the compressor flows through the first heat exchanger, the second heat exchanger and the third heat exchanger in this order, and a second circulation state where the refrigerant discharged from the compressor flows through the first heat exchanger, the third heat exchanger and the second heat exchanger in this order;
a first decompression device for decompressing refrigerant flowing out of the first heat exchanger in the first circulation state; and
a second decompression device for decompressing refrigerant flowing out of the third heat exchanger in the second circulation state.

9. The air conditioner according to claim 8, wherein,
in the first circulation state, refrigerant flowing out of the second heat exchanger is decompressed by the second decompression device, and is introduced into the third heat exchanger to absorb heat from outside air in the third heat exchanger.

10. The air conditioner according to claim 8, wherein,
in the second circulation state, the first decompression device decompresses refrigerant flowing from the first heat exchanger so as to adjust a heat amount radiated in the first heat exchanger.

11. The air conditioner according to claim 8, wherein the first heat exchanger is disposed to indirectly perform the heat exchange between refrigerant and air to be blown into the compartment, through a medium.

12. The air conditioner according to claim 8, further comprising
an air conditioning case for defining an air passage through which air flows into the passenger compartment,
wherein the first heat exchanger and the second heat exchanger are disposed in the air conditioning case to directly perform the heat exchange between refrigerant and air to be blown into the compartment.

13. An air conditioner comprising:
a compressor for sucking and compressing refrigerant;
first and second heat exchangers for performing a heat exchange between refrigerant and air to be blown into a compartment;
a third heat exchanger for performing a heat exchange between refrigerant and outside air; and
a switching device for setting one of a first circulation state and a second circulation state, wherein:
in the first circulation state, refrigerant discharged from the compressor flows through the first heat exchanger, the second heat exchanger and the third heat exchanger, in this order; and
in the second circulations state, the refrigerant discharged from the compressor is supplied to the first heat exchanger and the third heat exchanger while the first heat exchanger and the third heat exchanger are connected in series with respect to a refrigerant flow, and the refrigerant after passing through the first heat exchanger and the third heat exchanger is decompressed and is circulated into the second heat exchanger.

14. An air conditioner comprising:
a compressor for sucking and compressing refrigerant;
a first heat exchanger for performing heat exchange between refrigerant discharged from the compressor and air to be blown into a compartment;
a first decompression device for decompressing refrigerant flowing from the first heat exchanger;
a second heat exchanger for performing heat exchange between refrigerant from the first decompression device and air to be blown into the compartment;
a second decompression device for decompressing refrigerant from the second heat exchanger;
a third heat exchanger for performing a heat exchange between refrigerant from the second decompression device and outside air outside the compartment; and
a control unit for controlling a throttle opening degree of the second decompression device such that a refrigerant temperature in the second heat exchanger becomes higher than a refrigerant temperature in the third heat exchanger.

* * * * *